Figure 1:
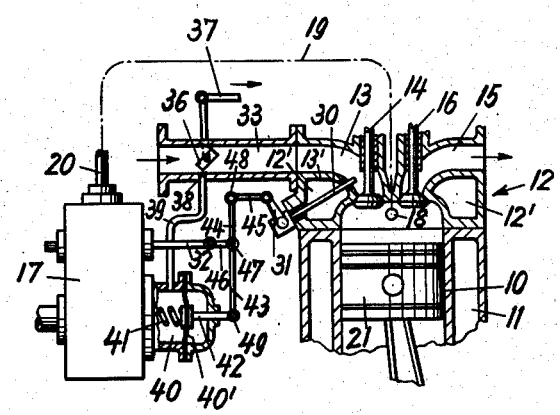

July 28, 1959    H. O. SCHERENBERG    2,896,600
CONTROL SYSTEM FOR AN INTERNAL COMBUSTION
ENGINE, PARTICULARLY FOR MOTOR VEHICLES
Original Filed March 23, 1954    2 Sheets-Sheet 1

INVENTOR
HANS O. SCHERENBERG

BY *Dicke and Craig*

ATTORNEYS

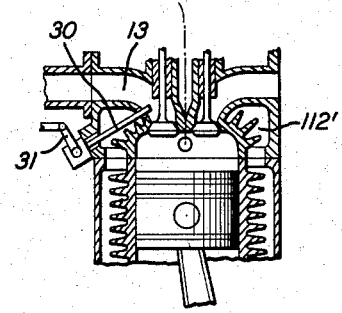
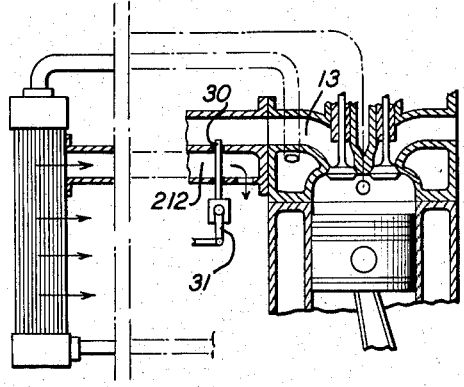
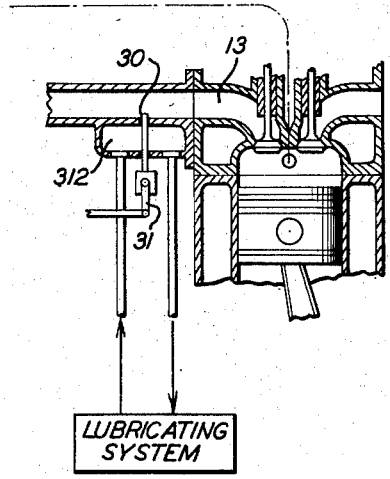
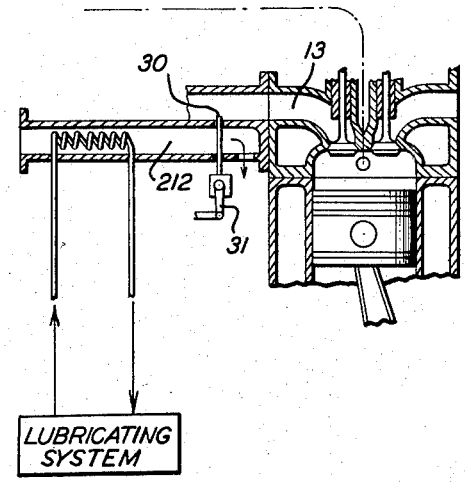

United States Patent Office 2,896,600
Patented July 28, 1959

2,896,600

CONTROL SYSTEM FOR AN INTERNAL COMBUSTION ENGINE, PARTICULARLY FOR MOTOR VEHICLES

Hans O. Scherenberg, Stuttgart-Heumaden, Germany, assignor to Daimler-Benz Aktiengesellschaft, Stuttgart-Unterturkheim, Germany Original application March 23, 1954, Serial No. 418,192, now Patent No. 2,808,038, dated October 1, 1957. Divided and this application December 8, 1955, Serial No. 551,942

Claims priority, application Germany April 2, 1953

12 Claims. (Cl. 123—140)

The present invention is a divisional application of my United States patent application, Serial No. 418,192, filed March 23, 1954, entitled "Control System for an Internal Combustion Piston Engine, Particularly for Motor Vehicles." This application has now matured into Patent No. 2,808,038, issued October 1, 1957.

The present invention relates to internal combustion piston engines of the type adapted to compress a fuel-gas mixture produced by a fuel pump injecting the fuel into a stream of air admitted to the cylinder for subsequent compression and ignition by a spark plug in which the ratio of fuel to air is adjusted by means of a thermostat.

More particularly, the invention relates to a control system for such an internal combustion piston engine, especially for motor vehicles.

In engines of this kind, part of the fuel will condense on the cold walls of the engine and duct system, such as the cylinder walls, when the engine is cold, whereby the air-fuel ratio in the mixture is rendered so lean that the ignition is adversely affected thereby. Consequently, it is difficult to start the engine in cold condition.

Accordingly, it is a primary object of the present invention to provide an improved control system whereby the fuel-air ratio in the mixture may be kept substantially constant irrespective of the variations of the temperature thereby facilitating the starting operation of the engine.

It is a further object of the present invention to provide a single thermostat which responds either directly or indirectly to the temperature of an auxiliary circulating system and to the temperature of the combustion air.

A further object of the present invention resides in the provision of a single temperature responsive element which takes into account the temperature of the combustion air as well as the temperature of the engine wall parts to control the air fuel ratio in the mixture.

It is still another object of the present invention to provide a simple and effective control arrangement for controlling the air-fuel mixture inversely proportional to the engine temperature and the ambient temperature of the combustion air.

By thus controlling the air-fuel mixture it is possible to achieve with a minimum of additional parts that the final condition of the combustion air immediately prior to combustion, the temperature of which is a function of the temperature of the combustion air as such and of the temperature of those wall parts with which the combustion air comes into contact immediately prior to combustion, is properly taken into account in the automatic regulation of the air-fuel mixture.

This results primarily in a facilitated starting of the engine as with a cold engine a part of the injected fuel condenses on the cold wall parts, as previously pointed out, so that the actual ratio of the mixture of the fuel particles at the moment of the ignition contained in the combustion air with respect to the air particles is leaner than was previously determined by the adjustment of the fuel quantity.

It is an object of the present invention to provide a control adjustment which controls the amount of fuel under those conditions in such a manner that a slightly greater amount of fuel is injected so that a more favorable ratio of the fuel-air mixture for purposes of ignition is available.

It is another object of the present invention to provide a thermostatic control arrangement which provides a larger amount of injection fuel at lower temperatures and which takes thereby into account the actual temperature of the combustion air as well as the temperature of those wall parts with which the air comes into contact immediately prior to ignition.

Figure 2:
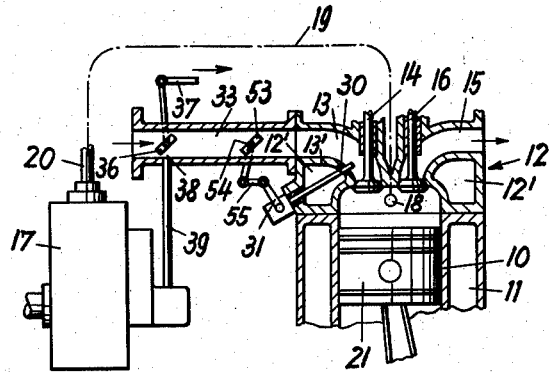

Further objects, features and advantages of the present invention will appear from the following description when taken in connection with the accompanying drawing which shows, for purposes of illustration only, two embodiments, and wherein:

Figure 1 is a partial sectional view through a cylinder and cylinder head of an internal combustion piston type engine provided with a thermostat adapted to control the air-fuel ratio of the combustible mixture compressed in the cylinder according to the present invention showing schematically the control arrangement, Figure 2 is a partial sectional view taken through a cylinder and cylinder head similar to Figure 1 of a different embodiment of an internal combustion engine in accordance wth the present invention, Figure 3 is a partial sectional view through the cylinder and cylinder head similar to Figure 1 but in which the thermostat for controlling the air-fuel ratio of the combustible mixture is in contact with the engine cooling air, Figure 4 is a partial sectional view through a cylinder and cylinder head similar to Figure 1 but in which the thermostat is in contact with the air that has passed through the radiator, Figure 5 is a partial sectional view through the cylinder and cylinder head similar to Figure 1 but in which the thermostat is in direct contact with the engine lubricant, and Figure 6 is a partial sectional view through the cylinder and cylinder head similar to Figure 1 but in which the thermostat is in contact with the air that has passed the cooling coil for the engine lubricant.

Referring now to the drawing wherein like reference numerals designate like parts, and more particularly to Figure 1, reference numeral 10 designates a cylinder block including a predetermined number of cylinders provided with a cooling jacket 11 and with a cylinder head 12. The cylinder head includes a cooling jacket 12', an intake duct 13 controlled by an intake valve 14 and an outlet duct 15 controlled by an outlet valve 16 for each cylinder. A fuel pump 17 is driven in the conventional manner by a cam shaft (not shown) that also actuates the valves 14 and 16. Each cylinder of the engine is equipped with an injection device 18 connected by a line or pipe 19 to an outlet 20 of the fuel pump 17. The latter is provided, as is customary, with one outlet for each cylinder and is so timed as to feed the fuel to the injection device 18 when the intake valve 14 is opened and air is thereby drawn in through the intake duct 13 into the cylinder by the piston 21. The pistons 21 actuate the customary crankshaft (not shown) which is geared in any suitable manner to the aforementioned cam shaft.

After the reciprocatory piston 21 has descended and drawn in the mixture charge into the cylinder 10, the piston 21 will then ascend and compress such charge for subsequent ignition by a spark plug (not shown).

In internal combustion piston engines of this type, it is desirable that the air-fuel ratio in the mixture be kept at its most favorable value irrespective of changes in temperature of the engine and of the air drawn into the intake duct 13. Engines of the type to which this invention relates are usually provided with one or more auxiliary fluid circuits, such as a circuit of a cooling liquid and/or a circuit of a lubricant which reflect the temperature of the engine. The circulation of the cooling water through the cooling jackets 11 and 12' may be in any conventional manner or may be of the type more fully described in the aforementioned parent application.

A thermostat 30 is so mounted in the cylinder head 12 as to be in contact with both the auxiliary cooling fluid, such as the cooling water circulating through the jacket 12' as well as with the wall 13' of the intake duct 13. In this manner the thermostat 30 responds to both the temperatures of the cooling fluid and combustion air temperatures. Fuel is supplied to the injection nozzle 18 by a fuel pump 17 over a line 19.

For the purpose of maintaining the air-fuel ratio in the mixture compressed by piston 21 as nearly constant as possible, the following control arrangement is provided:

The pump 17 comprises a control member in the form of a shiftable plunger 32 which by its position determines the quantities of fuel intermittently fed by the pump through the pipes 19 to the devices 18 of the cylinders. The intake duct 13 is connected with an intake connecting member 33. A throttle in the form of a butterfly valve 36 is mounted in the intake connecting member 33 and is adjustable by a suitable linkage 37 connected to a suitable control member such as the gas or accelerator pedal. The throttle 36 by its adjustment determines the weight of the air charge admitted to the cylinders. In order to control the quantities of fuel injected in proportion to such air charges, the intake connecting member 33 is tapped at point 38 and connected by a pipe 39 to a diaphragm chamber 40 forming part of the pump 17, the diaphragm member 40' being biased by a spring 41 which tends to adjust the diaphragm member 40' in opposition to the effect of the vacuum.

The air which flows through the intake manifold 33 past the throttle valve 36 produces a vacuum or depression at the point 38 which varies depending on the adjustment of the throttle valve. The effect of the vacuum or depression is transferred over the line 39 into the chamber 40 and thereby adjusts correspondingly the diaphragm member 40'.

The diaphragm member 40' is connected with the lower arm 43 of a two-armed lever 43, 44 by means of a connecting rod 42 and a pivot 49. The upper arm 44 of the two-armed lever 43, 44 is connected by a link 45 and pivot 48 to the arm 31 of the thermostat 30. The adjustable control plunger 32 is connected by a link 46 to the fulcrum 47 of the two-armed lever 43, 44 about which it may rotate.

*Operation*

The mode of operation is as follows:

When the throttle 36 is moved towards its closed position thereby reducing the weight of the air charge, vacuum is produced in the intake connecting member 33 and transmitted by line 39 to the diaphragm chamber, thereby moving the diaphragm to the left. The rod 42 thereby takes a varying position corresponding to the vacuum at the point 38, i.e., corresponding to the position of the throttle valve 36 which corresponds to the quantity of fuel injected into the engine cylinder. If it is considered at first that the pivot 48 is rigid, then the adjusting rod 32 will also assume different positions as a result of its interconnection by means of lever arm 43 and link 46. The arrangement is thereby made in such a manner that for each quantity of injected fuel in the cylinder an appropriate amount of combustion air is provided to produce the necessary fuel mixture. If the throttle is moved towards its closed position as described above, the plunger or adjusting rod 32 is thereby shifted to the left which results in a reduction of the quantities of fuel intermittently injected into the cylinders by the fuel pump 17.

A control adjustment which is responsive to temperature is superimposed on the aforementioned quantity regulation of the fuel to further control the quantity of fuel injected also depending on the temperature, for example, of wall parts of the engine and additionally of a fluid medium of a recirculating system of the engine.

The movement of the thermostat 30 in response to temperature variations is also transmitted to rod or plunger 32 by means of the upper lever arm 44 and the link 45 pivoting about pivot 48 and interconnecting the arm 31 of the thermostat 30 with the two-armed lever 43, 44. The arrangement of the temperature response means is such that a similar reduction of the fuel charges injected will be obtained by an increase in the temperature of the cooling liquid present in cooling jacket 12' owing to the rotation of shaft 31 in a counterclockwise direction causing link 45 to be moved to the left, such movement being transferred to the plunger 32 by the two-armed lever 43, 44 through link 46.

Thus, the position of rod 42 corresponds at any time to the degree of vacuum prevailing at the point 38 which in turn depends on the position of the throttle valve 36 and therewith on the weight of the air charges drawn into the cylinder 10 by piston 21.

Regarding now pivot 48 between lever arm 44 and link 45 stationary, the plunger 32 will be moved to a corresponding differential position by the two-armed lever 43, 44 and link 46, the arrangement being such that the required fuel quantity is allotted to any weight of the air charges drawn into the cylinder. The temperature responsive regulation is superimposed on the vacuum controlled regulation of the fuel quantity since the arm 31 assumes different positions depending on the temperature of the cooling liquid.

From the foregoing description, it will be evident that the plunger 32 is an adjustable regulating element operative to variably determine in dependence on its position the ratio of fuel and air of the combustible gaseous mixture compressed by piston 21 prior to the ignition thereof by a spark plug, and that the linkage 43 to 46 represents motion-transmitting means connecting the adjustable regulating element with the temperature responsive device 30 mounted in the cylinder head 12 to respond to the temperature of the fluid in the auxiliary fluid circuit 12' as well as on the temperature of the combustion air.

Since the temperature sensitive portion of the thermostat 30 passes through the outer wall of the cooling jacket 12' and through the wall of the intake duct 13, the temperature responsive device 30 responds simultaneously to the temperature of the cooling liquid and to that of the combustion air. As a result, the linkage 45 connecting the temperature responsive device 30 with the fuel regulating member or plunger 32 of the fuel pump will act to control the ratio of the fuel mixture depending on the temperature of the engine and on the temperature of the combustion air.

It is thus seen that the control arrangement according to Figure 1 of the present invention is such that with colder combustion air and colder cooling water, the adjusting rod 32 is moved in a direction in which it will increase the fuel quantity.

In the arrangement according to Figure 2, the thermostat 30 adjusts an additional throttle valve 53 over a shaft 54 extending to the outside of duct 33 and having an arm connected by a link 55 to the arm 31 of the thermostat 30.

The adjustment of the injection fuel pump takes place in the usual manner depending on the position of the main throttle valve as shown and described in connection with Figure 1. If the combustion air and the engine as determined by the temperature of the cooling liquid in jacket 12', to which the thermostatic element 30 is responsive, drops, then the arm 31 will rotate in such a direction as to move the auxiliary throttle valve 53 towards its closed position thereby reducing the air charge.

The position of the auxiliary throttle valve 53, however, has little or no effect upon the vacuum existing at point 38 and therewith prevailing in line 39 and chamber 40, and, consequently, the quantity of fuel injected depending on the position of the plunger 32 will remain substantially unaffected by variation of the air charge as a result of variations in the position of additional throttle 53. When, during the starting operation, the engine is in cold condition, or if the combustion air is in relatively cold condition, the auxiliary throttle valve 53 will be adjusted by the thermostat 30 to a throttling position in which it is more or less closed. This means that less volume of air will be drawn into the cylinders of the engine per stroke than would ordinarily correspond to the position of the main throttle valve 36. As, however, the vacuum at point 12 decisively depends on the position of the main throttle valve, relatively more fuel is injected under those conditions than with a warm engine and a warm combustion which corresponds to the actually prevailing conditions of the fuel mixture.

In other words, the driver may adjust the main throttle valve to cause the vacuum prevailing in chamber 40 to collapse whereby the controlling plunger corresponding to plunger 32 will be moved to the right causing the pump to inject large quantities of fuel into the cylinders resulting in a relatively rich mixture as a lesser amount of air charge reaches the cylinder owing to the position of the additional throttle valve 53 which, however, has essentially no control effect on the fuel pump adjusting plunger 32. This sequence in the control arrangement is, therefore, desired for the starting operation of the engine when cold. As the engine warms up and/or the combustion air becomes warmer, the throttle valve is gradually opened to the same extent.

By the temperature responsive control of the ratio of the air-fuel mixture in accordance with the present invention, the starting of the engine is considerably facilitated since the quantity of fuel injected will be larger when the engine is in a cold condition thereby assuring that the ratio of the mixture will be such as is required for reliable ignition. In either embodiment, the temperature responsive device is operative to increase the fuel quantity in relation to the weight of the air charge when the auxiliary fluid, such as cooling air or cooling water has a low temperature indicative of the cold condition of the engine and/or when the temperature of the combustion air is relatively low.

In addition to being in contact with the combustion air, the temperature responsive device in accordance with the present invention is in contact with the medium of a circulating system indicative of the engine temperature such as, for example, the circulating cooling water of a water-cooled internal combustion engine or the cooling air of an air-cooled internal combustion engine. The thermostat may be in direct contact with the medium indicative of the engine temperature, such as the cooling water as shown in Figures 1 and 2 or the cooling air passing through passage 112' as shown in Figure 3, or it may be in indirect contact therewith, for example, by being in contact with the air that has passed through passage 212 as shown in Figure 4 and has been heated by the device which effects re-cooling of the medium, such as the radiator of the water-cooled engine or the cooling coil for the lubricant in the lubrication system. In the two latter cases, the disposition of the thermostat in the air stream, offers the advantage that the installation in the cooling water lines or spaces and the troublesome sealing problems connected therewith may be avoided, thereby avoiding leakages which may occur when the thermostat is mounted in direct contact with the cooling water or the lubricant, respectively.

If the lubricating oil circulating system is used to control the thermostat it may be either in direct contact with the oil of the lubricating system as shown in Figure 5 or only in direct contact in that the air that has passed through the cooling coil for the lubricant is permitted to flow past the thermostat as shown in Figure 6.

Thus, the present invention contemplates to compensate variations in the temperature of the combustion air as well as of the engine.

Variations of the temperature of the combustion air passing through the intake duct 13 result in variations of the weight of the air charge. If the air is cold, a heavier air charge will be drawn into the cylinders than with a higher air temperature. Consequently, the ratio of air and fuel in the mixture requires a correction corresponding to the specific gravity of the air in order to insure an economical operation. This is achieved by the present invention by rendering the control dependent upon the temperature of the combustion air in addition to the temperature of the auxiliary fluid circuit. This is also the reason why the thermostat 30 in all embodiments is arranged so as to respond to both the temperature of the air passing through the intake duct 13 and to the temperature of the fluid used for cooling or lubricating the engine.

While I have described my invention with reference to a number of preferred embodiments thereof, I wish it to be clearly understood that the same is in no way limited to the details described but is capable of numerous modifications within the scope of the appended claims.

I claim:

1. A control system for an internal combustion piston engine of the type adapted to compress a fuel-gas mixture produced by a fuel pump prior to its ignition by a spark plug with an auxiliary circuit containing a fluid circulating therethrough the temperature of which is proportional to the temperature of the engine, comprising adjustable regulating means operative in dependence on the position thereof to variably determine the ratio of the fuel and air in said mixture, a single temperature responsive means responsive simultaneously to the temperature of said fluid and to the temperature of the combustion air, and motion transmitting means connecting said adjustable regulating means with said temperature responsive means.

2. A control system according to claim 1, wherein said temperature responsive means is in direct contact with said fluid.

3. A control system according to claim 1, wherein said temperature responsive means is indirectly responsive to the temperature of said fluid.

4. A control system for an internal combustion piston engine of the type adapted to compress a fuel-gas mixture comprising an auxiliary circuit, containing a fluid circulating therethrough the temperature of which is proportional to the temperature of the engine, adjustable regulating means for variably determining the fuel-air ratio in said mixture, a single temperature responsive means responsive simultaneously to the temperature of said fluid and to the temperature of the combustion air, and motion transmitting means connecting said adjustable regulating means with said temperature responsive means to adjust said ratio depending on the temperature of said fluid and of said combustion air and to thereby facilitate the starting operation of the engine in cold condition.

5. A control system for an internal combustion piston engine of the type adapted to compress a fuel-gas mixture produced by a fuel pump prior to its ignition by a spark plug comprising an auxiliary circuit containing fluid circulating therethrough for cooling the engine, adjustable regulating means operative in dependence on the position thereof to variably determine the ratio of fuel and air in said mixture, a single temperature responsive device responsive simultaneously to the temperature of the cooling fluid and to the temperature of the combustion air, and motion transmitting means connecting said adjustable regulating means with said temperature responsive device.

6. A control system according to claim 5, wherein said auxiliary circuit contains water for cooling, and wherein said temperature responsive device is in direct contact with the cooling water thereof.

7. A control system for an internal combustion piston engine of the type adapted to compress a fuel-gas mixture produced by a fuel pump prior to its ignition by a spark plug comprising an auxiliary fluid circuit with a cooling liquid for cooling the engine, means for cooling said cooling liquid, adjustable regulating means operative in dependence on the position thereof to variably determine the ratio of fuel and air in said mixture, a single temperature responsive means responsive simultaneously to the temperature of the cooling air heated after passage past said means for cooling said cooling liquid and to the temperature of the combustion air, and motion transmitting means connecting said adjustable regulating means with said temperature responsive means.

8. A control system for an air-cooled internal combustion piston engine of the type adapted to compress a fuel-gas mixture produced by a fuel pump prior to its ignition by a spark plug comprising means for cooling said engine by air, adjustable regulating means operative in dependence on the position thereof to variably determine the ratio of fuel and air in said mixture, a single temperature responsive means responsive simultaneously to the temperature of the cooling air after being heated by said engine to indicate the temperature thereof and to the temperature of the combustion air, and motion transmitting means connecting said adjustable regulating means with said temperature responsive means.

9. A control system for an internal combustion piston engine of the type adapted to compress a fuel-gas mixture produced by a fuel pump prior to its ignition by a spark plug comprising an auxiliary circuit containing a fluid circulating therethrough including wall parts containing said fluid medium for cooling the engine, adjustable regulating means operative in dependence on the position thereof to variably determine the ratio of fuel and air in said mixture, a single temperature responsive means responsive simultaneously to the temperature of the wall parts of said auxiliary circuit traversed by the cooling fluid and to the temperature of the combustion air, and motion transmitting means connecting said adjustable regulating means with said temperature responsive means.

10. A control system for an internal combustion piston engine of the type adapted to compress a fuel-gas mixture produced by a fuel pump prior to its ignition by a spark plug comprising an auxiliary circuit containing a fluid circulating therethrough with wall parts containing said fluid for cooling the engine, adjustable regulating means operative in dependence on the position thereof to variably determine the ratio of fuel and air in said mixture, a single temperature responsive means responsive simultaneously to the temperature of said cooling fluid and of the wall parts of said auxiliary circuit and to the temperature of the combustion air, and motion transmitting means connecting said adjustable regulating means with said temperature responsive means.

11. A control system for an internal combustion piston engine of the type adapted to compress a fuel-gas mixture comprising an auxiliary circuit for said engine, containing a fluid circulating therethrough the temperature of which is proportional to the temperature of the engine, adjustable regulating means operative in dependence on the position thereof to variably determine the ratio of fuel and air in said mixture, a single temperature responsive means responsive simultaneously to the temperature of said fluid and to the temperature of the combustion air of said mixture, and means controlling said adjustable regulating means by said temperature responsive means to maintain a predetermined fuel-gas mixture immediately prior to combustion of said mixture.

12. A control system for an internal combustion piston engine of the type adapted to compress a fuel-gas mixture produced by a fuel pump prior to its ignition by a spark plug and provided with two separate flow circuits, one of said flow circuits contains a fluid medium circulating therethrough having a temperature proportional to the temperature of the engine and the other one of said circuits contains a fluid medium used for combustion purposes in the engine, comprising adjustable regulating means operative in dependence on the position thereof to variably determine the ratio of the fuel and air in said mixture, a single temperature responsive means responsive simultaneously to the temperature of both of said media and motion transmitting means connecting said adjustable regulating means with said temperature responsive means.

References Cited in the file of this patent

UNITED STATES PATENTS

| | | |
|---|---|---|
| 1,869,429 | King et al. | Aug. 2, 1932 |
| 2,378,037 | Reggio | June 12, 1945 |

FOREIGN PATENTS

| | | |
|---|---|---|
| 538,229 | Great Britain | July 25, 1941 |